US012240736B2

(12) United States Patent
Wang et al.

(10) Patent No.: US 12,240,736 B2
(45) Date of Patent: Mar. 4, 2025

(54) CONSTRUCTION METHOD FOR FULLY PREFABRICATED MULTI-STORY CONCRETE PLANT

(71) Applicants: GMC GRAND-BAY INTELLIGENT MANUFACTURING AND TECHNOLOGY CO., LTD., Guangzhou (CN); Guangzhou Wu Yang Construction Machinery Co., Ltd., Guangzhou (CN)

(72) Inventors: Long Wang, Guangzhou (CN); Zhenying Chen, Guangzhou (CN); Wenshen Zhong, Guangzhou (CN); Zhen Yu, Guangzhou (CN); Jiali Cao, Guangzhou (CN); Tao He, Guangzhou (CN); Cheng Li, Guangzhou (CN); Yafei Zhang, Guangzhou (CN)

(73) Assignees: GMC GRAND-BAY INTELLIGENT MANUFACTURING AND TECHNOLOGY CO., LTD., Guangdong (CN); GUANGZHOU WU YANG CONSTRUCTION MACHINERY CO., LTD., Guangzhou (CN)

( * ) Notice: Subject to any disclaimer, the term of this patent is extended or adjusted under 35 U.S.C. 154(b) by 0 days.

(21) Appl. No.: 18/009,462

(22) PCT Filed: Oct. 25, 2021

(86) PCT No.: PCT/CN2021/126053
§ 371 (c)(1),
(2) Date: Dec. 9, 2022

(87) PCT Pub. No.: WO2023/070256
PCT Pub. Date: May 4, 2023

(65) Prior Publication Data

US 2024/0010476 A1 Jan. 11, 2024

(51) Int. Cl.
*B66C 23/32* (2006.01)
*B66C 17/20* (2006.01)
*B66C 23/62* (2006.01)

(52) U.S. Cl.
CPC .............. *B66C 23/32* (2013.01); *B66C 17/20* (2013.01); *B66C 23/62* (2013.01)

(58) Field of Classification Search
CPC ....... B66C 23/26; B66C 23/28; B66C 23/342; B66C 23/346; B66C 23/348; B66C 23/62;
(Continued)

(56) References Cited

U.S. PATENT DOCUMENTS 3,333,712 A * 8/1967 Owen ..................... B66C 23/32 212/176
5,426,907 A * 6/1995 Franklin ................. B66C 23/32 212/253
(Continued)

FOREIGN PATENT DOCUMENTS

CN 1267632 A 9/2000
CN 103089019 A 5/2013
(Continued)

*Primary Examiner* — Sang K Kim
*Assistant Examiner* — Nathaniel L Adams
(74) *Attorney, Agent, or Firm* — Muncy, Geissler, Olds & Lowe, P.C

(57) ABSTRACT

Provided is a construction method for a fully prefabricated multi-story concrete plant, the construction method may achieve full coverage of a hoisting operation of the large beam and column prefabricated components of a floor by employing a single intelligent hoisting robot, an angle change of the track devices, an angle change of a moving device, and a self-lifting device. It is not necessary to arrange a transition track at the turn of the installation route, which saves space and installation cost, and overcomes the disadvantage of high cost caused by the traditional prefabricated construction mode of multi-story concrete plant,
(Continued)

which needs to arrange a plurality of large hoisting equipment. It may achieve the mechanization and intelligence of the whole construction process of the fully prefabricated multi-story concrete plant.

9 Claims, 7 Drawing Sheets

(58) Field of Classification Search
CPC ........... B66C 17/20; B66C 23/32; B66C 7/12; B66C 7/00
See application file for complete search history.

(56) References Cited

U.S. PATENT DOCUMENTS

| | | | | |
|---|---|---|---|---|
| 5,881,504 A * | 3/1999 | Wakisaka | B66C 23/32 52/749.1 |
| 8,960,460 B2 * | 2/2015 | Mentink | B66C 23/74 212/197 |
| 2021/0292134 A1 * | 9/2021 | Kalanj | B66C 23/32 |

FOREIGN PATENT DOCUMENTS

| | | | | |
|---|---|---|---|---|
| CN | 105293315 A | 2/2016 | |
| CN | 110182694 A | 8/2019 | |
| CN | 110259152 A | 9/2019 | |
| CN | 212241540 U | 12/2020 | |
| FR | 1113697 A1 * | 4/1956 | |
| JP | 2001146842 A | 5/2001 | |
| WO | WO-2020042323 A1 * | 3/2020 | B66C 7/04 |

* cited by examiner

CONSTRUCTION METHOD FOR FULLY PREFABRICATED MULTI-STORY CONCRETE PLANT

CROSS-REFERENCE TO RELATED APPLICATIONS

This application claims priority to PCT Application No. PCT/CN2021/126053, having a filing date of Oct. 25, 2021, the entire contents of foresaid documents are hereby incorporated by reference.

TECHNICAL FIELD

The present disclosure belongs to the technical field of prefabricated building, and particularly relates to a construction method for a fully prefabricated multi-story concrete plant.

BACKGROUND

With the development of the social economy, governments at all levels have issued policies successively to promote the construction of Industry's Going Upstairs (IGU) project and high-standard plants, in order to improve economical and intensive use of industrial land, the efficiency of resource allocation, and promote industrial agglomeration, so that a large number of multi-story concrete plants are being built.

The horizontal and lateral structures of multi-story concrete plant are relatively regular, which has the characteristics of modularization, standardization and generalization, and has the favorable conditions to promote the implementation of prefabricated building. In response to the state and governments at all levels to vigorously promote the prefabricated technolog, we are exploring the structural system of the prefabricated multi-story concrete plant in line with industrial construction characteristic, and actively practicing the new concept of "innovation, coordination, green, opening and sharing". Governments at all levels also require a prefabrication rate for Industry's Going Upstairs project. However, the concrete plants in IGU project generally have a large span, high storey height, as well as large size and heavy weight of components. The traditional prefabricated construction method is not only costly for transportation and on-site hoisting, but also has high requirements for hoisting machinery configuration, which inevitably leads to a substantial increase in construction costs. As a result, it is difficult to promote the traditional prefabricated construction method in the IGU concrete plant project, so a large number of IGU concrete plant construction projects still adopt a labor-intensive, extensive cast-in-place construction mode, or the projects are holding back because of the requirements of the local policy on the prefabrication rate and the construction cost.

The present disclosure focuses on an efficient and economical construction process of a fully prefabricated multi-story concrete plant in IGU, and develops a key technology for intelligent construction of the IGU concrete plant with modern industrialization, so as to achieve cost reduction and efficiency improvement. It will not only solve a problem of the application of the prefabricated construction of the concrete plant, but also greatly improve the level of scientific and technological progress of state's construction industry. It will also effectively promote the high-quality development of state's IGU concrete plant and promote industrial agglomeration, so as to further enhance its support and leading role in national economic development and opening up.

SUMMARY

A construction method for a fully prefabricated multi-story concrete plant, the construction method comprises the following steps:

1) According to a project scheduling and characteristics of the regular plane layout and a long longitudinal length of the multi-story concrete plant, a temporary site for prefabricating column and beam components may be arranged at the construction site, composite floors, wall panels and the like, which may be divided into components of conventional transportation or hoisting units, are prefabricated in a factory.

Optionally, intelligent and mechanized assembly molds may be employed for a flow-type arrangement to prefabricate the column and beam components.

2) Arranging one or more conventional tower cranes at a rational position of the plant structure plane for the transportation of the column and beam prefabricated components from the ground to each floor in a vertical direction, and for the installation of the composite floors and the wall panels.

The conventional tower cranes is configured for minimizing the horizontal transportation amount from an unloading point of the column and beam prefabricated components to each installation position, and is capable of meeting the requirement of hoisting the composite floors and the prefabricated wall panels.

According to the characteristics of the plant project and the requirements of cost control, there may be no conventional tower crane, but an automobile crane(s) or a crawler crane(s) is/are utilized instead to achieve the transportation of the column and beam prefabricated components in the vertical direction, as well as the hoisting of the composite floor and the prefabricated wall panels.

3) A signal device is provided at installation points of the columns and the beams of the floors, and the large column and beam prefabricated components are transported along the floor from the transportation unloading point in the vertical direction to an corresponding installation point according to a construction process plan by an automatic guided vehicle (AGV).

Optionally, the AGV has an automatic unloading function, and implements as a pair of multi-wheel low-flat-plate trolleys in consideration of the bearing capacity of a lower floor.

4) Utilizing an intelligent hoisting robot capable of self-lifting and horizontal moving to successively complete the installation of the large column and beam prefabricated components of the floors, and utilizing tower cranes arranged at the periphery of the plant to alternately perform the hoisting and installation of the prefabricated composite floor and prefabricated wall panels, as well as the pouring of floor concrete. The specific steps are as follows:

- S1, arranging an installation route of a floor plane in advance, wherein the installation route comprises a longitudinal route and a lateral route;
- S2, laying track devices on the installation route, and installing an intelligent hoisting robot on the track devices;
- S3, performing hoisting and installation of column and beam prefabricated components required for the plant along the longitudinal route via the intelligent hoisting robot on the track devices;

S4, acting on the intelligent hoisting robot including a self-lifting device to disengage the intelligent hoisting robot from the track devices on the longitudinal route via a driving end of the self-lifting device at a turn of the installation route, and after the track device is turned and mounted to the lateral route, the intelligent hoisting robot is connected to the track devices on the lateral route; and the intelligent hoisting robot on the track devices performs hoisting and installation of the column and beam prefabricated components required for the plant along the lateral route;

S5, acting on the intelligent hoisting robot to disengage the intelligent hoisting robot from the track devices on the lateral route via the driving end of the self-lifting device at a turn of the lateral route, and after the track devices are turned and mounted to the longitudinal route, the intelligent hoisting robot is connected to the track devices on the longitudinal route, and the intelligent hoisting robot on the track devices performs hoisting and installation of the column and beam prefabricated components required for the plant along the longitudinal route;

S6, lifting the intelligent hoisting robot to the installed floor plane via the self-lifting device after installation of the floor plane, and repeating the above-mentioned steps of S1 to S5 until the roof of the multi-story plant is installed.

Specifically, in S2, the track device comprises a movable steel beam, an embedded part and a track member, wherein the movable steel beam is laid on the floor plane via the embedded part, and the track member is provided on an upper surface of the movable steel beam.

Specifically, at least two sets of track devices are provided, and each set of track devices comprises two movable steel beams symmetrically arranged on both sides of the installation route.

Specifically, the intelligent hoisting robot further comprises an inner tower body, an outer tower body, a moving device, and a hoisting device;

the outer tower body serves as a supporting structure during the hoisting of the intelligent hoisting robot, the inner tower body serves as a guiding structure and a supporting structure during self-lifting of the intelligent hoisting robot, and the inner tower body cooperates with the outer tower body to constitute a self-lifting system of the intelligent hoisting robot;

the self-lifting device provided between the inner tower body and the outer tower body comprises a jacking cylinder and a forced cross-beam, wherein the inner tower body is provided with a lower base, the outer tower body is provided with an upper base, the jacking cylinder is connected to the lower base via the forced cross-beam, and the jacking cylinder is connected to the upper base;

the outer tower body is provided with a chassis, the moving device is provided on the chassis, and the moving device includes an installation seat, a steering shaft, a motor, a connecting base, a moving wheel and a rail clamp, wherein the installation seat is connected to the chassis, both ends of the steering shaft are respectively rotatably connected to the installation seat and the connecting base; the motor, the moving wheel and the rail clamp are provided on the connecting base, and the motor has a driving end for driving the moving wheel to rotate; and the hoisting device is connected to the outer tower body.

Specifically, in S3, S4 and S5, the specific steps of the intelligent hoisting robot moving along the track devices are as follows:

the track devices are divided into a first set of track devices and a second set of track devices, when the column and beam prefabricated components within reach of the intelligent hoisting robot at the first set of track devices are installed, the intelligent hoisting robot moves to the second set of track devices, and the intelligent hoisting robot is utilized to remove and hoist the first set of track devices and move to the second set of track devices for installation along the installation route; similarly, after the column and beam prefabricated components within reach of the intelligent hoisting robot at the second set of track devices are installed, the intelligent hoisting robot is utilized to remove and hoist the second set of track devices and move to the first set of track devices for installation along the installation route. Repeat the foresaid steps until the intelligent robot moves to the bay at the other end of the plant.

Specifically, in S4 and S5, the specific steps for the turning of the intelligent hoisting robot at the turn of the installation route are as follows:

a beam seat is provided below the intelligent hoisting robot as a support for the lifting, the beam seat is provided on the floor plane, after the moving device is raised to a certain height by the self-lifting device, the track devices below the moving device are disassembled and turned 90 degrees for installation, then a moving direction of the moving device of the intelligent robot is adjusted to follow the installation direction of the track devices below the moving device, the moving device is lowered back to the track devices and moves thereon. When moving to another turn of the installation routes again, the intelligent robot performs the steps of lifting and lowering again, and the moving direction of the moving device is adjusted to follow the installation direction of the track devices below the moving device.

Specifically, in S3, S4 and S5, the hoisting of the column and beam prefabricated components includes installing a supporting column, a frame beam and a secondary beam, then the conventional tower crane is arranged to alternately perform the hoisting and installation of the prefabricated composite floor and wall panels, and the pouring of floor concrete; and not to install the secondary beam and the prefabricated composite floor temporarily when the intelligent hoisting robot moves to the last bay surrounded by the support column, thereby leaving a lifting passage for the intelligent hoisting robot to be self-lifted.

Specifically, in S6, the specific steps of the intelligent hoisting robot being lifted to the next floor plane via the self-lifting device are as follows:

employing the intelligent hoisting robot to remove the prior set of the track devices, hoisting the prior set of the track devices to the vicinity of the predetermined installation position of a next floor without obstructing the passage for the intelligent hoisting robot to be self-lifted; and a beam seat is provided below the inner tower body of the intelligent hoisting robot as a support for self-lifting, and the self-lifting device of the intelligent hoisting robot is utilized to raise the moving device to an appropriate position at the top elevation of the predetermined installation position of the track devices, after the track devices are raised to the vicinity of the predetermined position and mounted in place, the self-lifting device is employed to perform the lowering of the intelligent hoisting robot and the connection between the self-lifting device and the track devices; and finally the inner tower body of the intelligent hoisting robot is retracted, reset and fixed.

Specifically, prior to step S1, arranging one or more conventional tower cranes at a plane position of the plant structure for the transportation of the column and beam prefabricated components from the ground to each floor in a vertical direction, as well as the installation of the composite floor and the wall panels, the conventional tower cranes are arranged for minimizing the horizontal transportation amount from an unloading point of the column and beam prefabricated components to each installation position, and meeting the hoisting requirement of the composite floor and the prefabricated wall panels;

In cases where an automobile crane(s) or a crawler crane(s) is/are capable of meeting the requirements for hoisting the prefabricated components for the plant, the automobile crane(s) or the crawler crane(s) is/are utilized to achieve the transportation of the column and beam prefabricated components in the vertical direction, as well as the hoisting of the composite floor and the prefabricated wall panels according to the requirements for cost control.

Finally, the construction method further comprises S7: the intelligent hoisting robot and the track devices are removed via a conventional tower crane or an automobile crane, or via a mechanical equipment such as a gin pole.

Compared to the prior art, an advantageous effect of the present disclosure is as follows:

The construction method for a fully prefabricated multi-story concrete plant provided by the present disclosure may achieve full coverage of a hoisting operation of the large beam and column prefabricated components of a floor, and overcomes the disadvantage of high cost caused by the traditional prefabricated construction mode of multi-story concrete plant which needs to arrange a plurality of large hoisting equipment. It may achieve the mechanization and intelligence of the whole construction process of the fully prefabricated multi-story concrete plant, and break through the industrial dilemma that the traditional prefabricated construction mode is employed for the construction of the concrete plant in Industry's Going Upstairs, and the cast-in-place construction mode is still utilized for a large number of projects, thereby achieving the cost reduction and efficiency improvement. Not only will the present disclosure fill the gap in the international and Chinese key technologies of the whole process of industrialized construction of the concrete plant in Industry's Going Upstairs project, which leads and promotes the development of state's prefabricated buildings and intelligent construction, but it also have great significance for the advance of science and technology in state's construction industrialization.

BRIEF DESCRIPTION OF DRAWINGS

In order to more clearly illustrate a technical solution of an embodiment of the present disclosure, a brief description will be given below with reference to the accompanying drawings which are employed in the description of an embodiment. It is obvious that the drawings in the description below illustrate some embodiments of the present disclosure, and other drawings may be obtained by a person skilled in the art without any inventive effort.

LIST OF REFERENCE CHARACTERS

1—supporting column
2—frame beam
3—secondary beam
4—composite floor
5—track device
501—movable steel beam
502—track member
6—intelligent hoisting robot
601—inner tower body
602—outer tower body
603—moving device
60301—installation seat
60302—steering shaft
60303—motor
60304—connecting base
60305—moving wheel
60306—rail clamp
604—hoisting device
605—self—lifting device
60501—jacking cylinder
60502—forced cross—beam
60503—lower base
60504—upper base
606—Chassis
607—beam seat.

DETAILED DESCRIPTION OF EMBODIMENTS

In order that a technical problem to be solved, a technical solution to be utilized and a technical effect to be achieved by the present disclosure may be more clearly understood, a further detailed description of embodiments of the present disclosure is provided below. It is apparent that the described embodiments are only some embodiments of the present disclosure, rather than all the embodiments. Based on the embodiments of the present disclosure, all other embodiments obtained by a person skilled in the art without inventive effort fall within the scope of the present disclosure.

In the description of the present disclosure, unless expressly stated or limited otherwise, the terms “in connection with/to”, “connected”, and “secured” are to be interpreted broadly, e.g. fixedly connected, detachably connected, or integrally connected; it may be a mechanical connection or an electrical connection; it may be directly connected or indirectly connected through an intermediate medium, and there may be the internal communication between two elements or the interactive relationship between two elements. The specific meaning of the above terms in the present disclosure will be understood accordingly to a person skilled in the art.

In the present disclosure, unless otherwise expressly specified or defined, the expression of a first feature is “above” or “below” a second feature may include that the first feature and the second feature are in direct contact, and may also include that the first feature and the second feature are not in direct contact but are in contact through additional features between them. Furthermore, the expression of the first feature is “over”, “above” or “on” the second feature includes that the first feature is directly above and obliquely above the second feature, or merely indicates that the first feature is higher than the second feature in height. And the expression of the first feature is “under”, “below” or “beneath” the second feature includes that the first feature is directly beneath and obliquely beneath the second feature, or merely indicates that the first feature is lower than the second feature in height.

Figure 1:
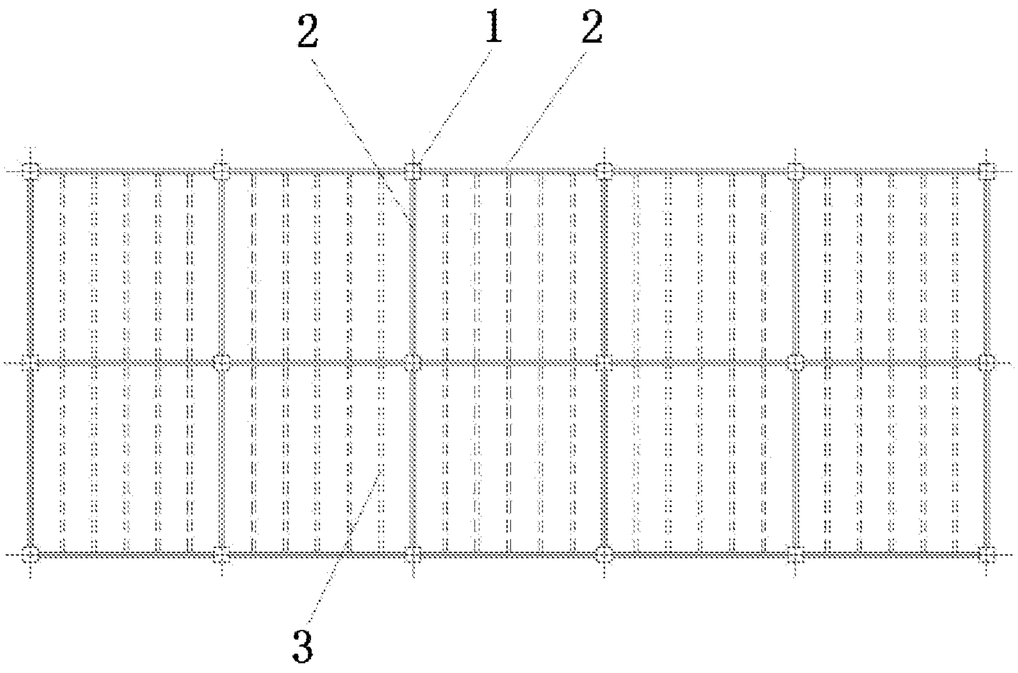
FIG. 1 is a plan layout diagram of a standard story structure of a fully prefabricated multi-story concrete plant according to the present disclosure.

Referring to FIGS. 1-9:

A technical solution takes a fully prefabricated multi-story concrete plant with three floors, two spans and five bays as an example. As shown in FIG. 1 which is a plan layout diagram of a standard story structure of a fully prefabricated multi-story concrete plant, where the column spacing between adjacent supporting columns 1 is 15 m×15 m, the cross-sectional dimension of each supporting column 1 is 1200 mm×1200 mm, and the column height of each supporting column 1 is 8000 mm. Frame beams 2 include two cross-sectional dimensions which are 400 mm×1500 mm and 300 mm×1200 mm respectively, the cross-sectional dimension of a secondary beam 3 is 250 mm×900 mm, the spacing between the adjacent secondary beams 3 is 2.5 m, and the thickness of a composite floor 4 is 150 mm.

According to the present solution, a construction method for a fully prefabricated multi-story concrete plant is provided, including the following steps:

1) With regard to the structure of a plant in FIG. 1, the required prefabricated frame beams 2 respectively weigh 18.63 tons, 10.87 tons and have a length of 13.8 m; the prefabricated secondary beam 3 weighs 6.84 tons and has a length of 14.6 m; the prefabricated supporting column 1 weighs 28.8 tons; the prefabricated composite floor 4 has a dimension of 2250 mm×3650 mm and a weight of 1.23 tons.

Due to the large size and heavy weight of the beam and column prefabricated components, the traditional method of transporting the prefabricated components from the factory to the construction site has high transportation requirements and high costs. According to the general characteristics of the regular plane layout and a long longitudinal length of the multi-story concrete plant, a temporary site for prefabricating components may be arranged at the construction site, such as temporary roads, etc., and the prefabrication of the beam and column large components is performed on-site. Optionally, taking advantage of the long longitudinal length of the project site, intelligent and mechanized assembly molds may be employed for a flow-type arrangement to prefabricate the column and beam components. The prefabricated composite floor 4, prefabricated wall panels, and the like may be divided into conventional transportation/hoisting units according to the size and weight thereof, and are prefabricated in a factory and transported to the construction site, the details are as follows.

2) Arranging one or more conventional tower cranes at a plane position of the plant structure for the transportation of the column and beam prefabricated components from the ground to each floor in a vertical direction, and the installation of the composite floor 4 and the wall panels, wherein the conventional tower cranes are arranged for minimizing the horizontal transportation amount from an unloading point of the column and beam prefabricated components to each installation position, and meeting the hoisting requirement of the composite floor 4 and the prefabricated wall panels.

In cases where an automobile crane(s) or a crawler crane(s) is/are capable of meeting the requirements for hoisting the prefabricated components for the plant, the automobile crane(s) or the crawler crane(s) is/are utilized to complete the transportation of the column and beam prefabricated components in the vertical direction, as well as the hoisting of the composite floor 4 and the prefabricated wall panels according to the requirements for cost control.

3) With regard to the above-mentioned transportation, a signal device is provided at installation points of the columns and the beams of the floors, and the large column and beam prefabricated components are transported along the floor from the transportation unloading point in the vertical direction to the corresponding installation point according to a construction process plan by an automatic guided vehicle. Optionally, the automatic guided vehicle has an automatic unloading function in consideration of the bearing capacity of a lower floor.

4) Utilizing an intelligent hoisting robot capable of self-lifting and horizontal moving to successively complete the installation of the large column and beam prefabricated components of the floors, and utilizing the tower cranes arranged at the periphery of the plant to alternately perform the hoisting and installation of the prefabricated composite floor and prefabricated wall panels, as well as the pouring of floor concrete. The specific steps are as follows.

Figure 2:
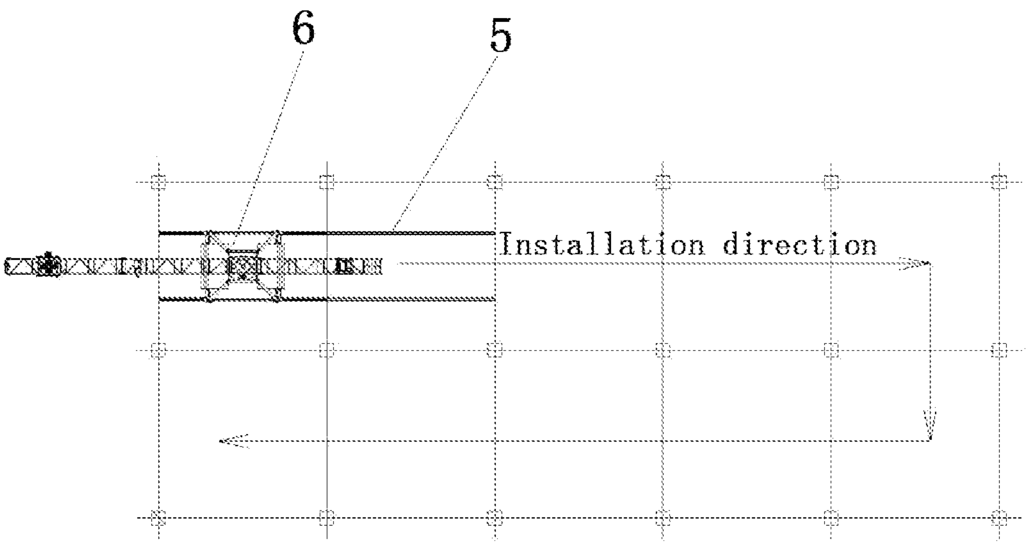
FIG. 2 is a plan route diagram of the installation of a fully prefabricated multi-story concrete plant according to the present disclosure.

S1, arranging an installation route of a floor plane in advance, as shown in FIG. 2, the installation route is a U-shaped route, which includes a longitudinal route and a lateral route;

S2, laying track devices 5 on the installation route, and installing an intelligent hoisting robot 6 on one of the track devices 5.

Specifically, the track device 5 includes a movable steel beam 501, an embedded part and a track member 502, wherein the movable steel beam 501 is laid on the floor plane via the embedded part, and the track member 502 is provided on an upper surface of the movable steel beam 501. Two sets of the track devices 5 are provided, and the track devices 5 are divided into a first and second set of track devices 5. Each set of the track devices 5 includes two movable steel beams 501 symmetrically arranged at both sides of the installation route; where a tower crane or an automobile crane is employed to perform the installation of the intelligent hoisting robot 6 on the first set of track devices 5.

Figure 8:
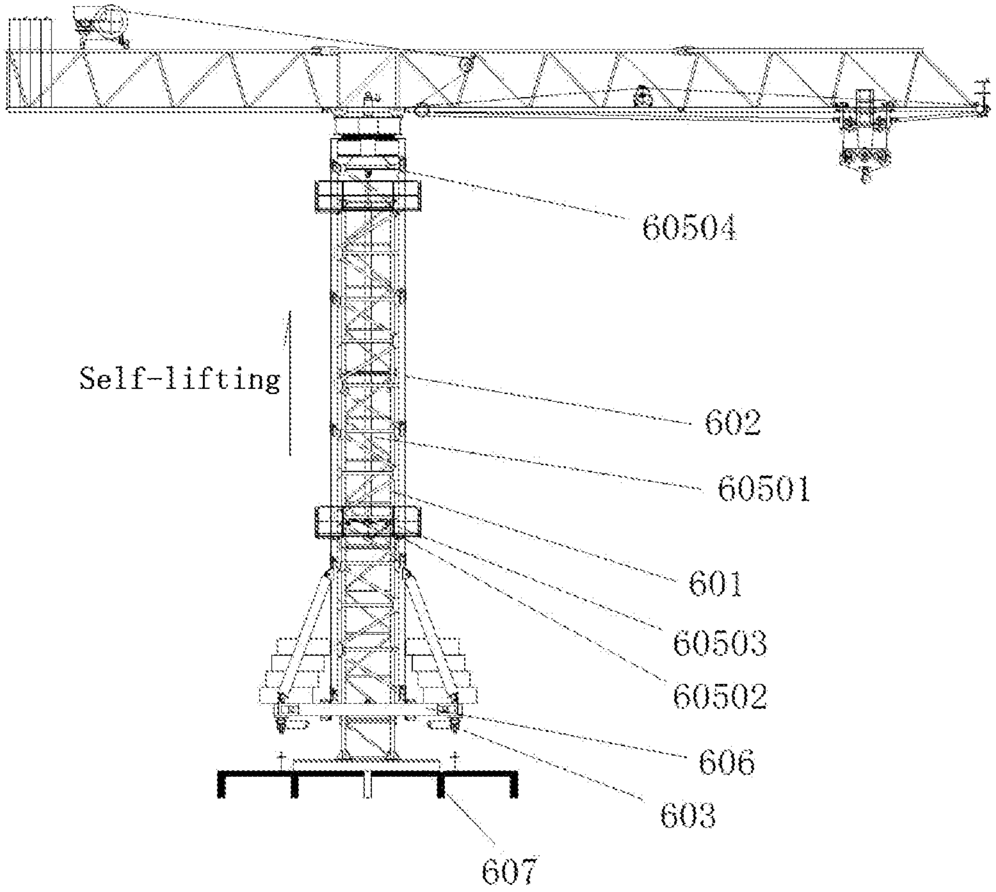
FIG. 8 is a schematic diagram illustrating the structure of an intelligent hoisting robot according to the present disclosure.
Figure 9:
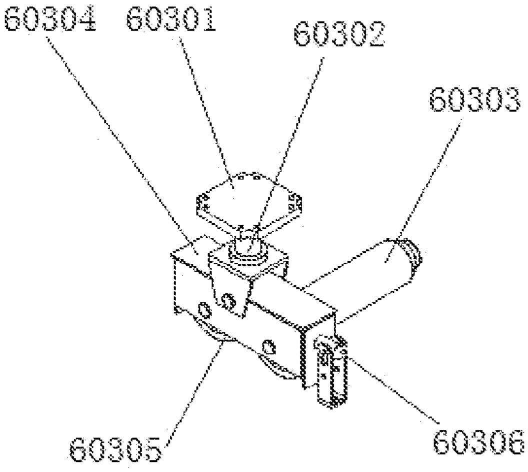
FIG. 9 is a schematic diagram illustrating the structure of a moving device of an intelligent hoisting robot according to the present disclosure.

As shown in FIGS. 8 and 9, the intelligent hoisting robot 6 includes an inner tower body 601, an outer tower body 602, a moving device 603, a hoisting device 604 and a self-lifting device 605.

The inner tower body 601 is in sliding fit with the outer tower body 602.

The self-lifting device 605 provided between the inner tower body 601 and the outer tower body 602 includes a jacking cylinder 60501 and a forced cross-beam 60502, the inner tower body 601 is provided with a lower base 60503, and the outer tower body 602 is provided with a upper base 60504, wherein the jacking cylinder 60501 is connected to the lower base 60503 via the forced cross-beam 60502, and the jacking cylinder 60501 is connected to the upper base 60504.

The outer tower body 602 is provided with a chassis 606, the moving device 603 is provided on the chassis 606, the moving device 603 includes an installation seat 60301, a steering shaft 60302, a motor 60303, a connecting base 60304, a moving wheel 60305 and a rail clamp 60306, wherein the installation seat 60301 is connected to the chassis 606, two ends of the steering shaft 60302 are respectively rotatably connected to the installation seat 60301 and the connecting base 60304; the motor 60303, the moving wheel 60305 and the rail clamp 60306 are provided on the connecting base 60304, and the motor 60303 has a driving end for driving the moving wheel 60305 to rotate.

A main body of a tower crane is provided on the outer tower body 602, and the hoisting device 604 is connected to the outer tower body 602 via the main body.

S3, the intelligent hoisting robot 6 performs the hoisting of the column and beam prefabricated components required by the plant on the track devices 5 and along the longitudinal route.

S4, the intelligent hoisting robot 6 includes a self-lifting device 605. At a turn of the installation route, a driving end of the self-lifting device acts on the intelligent hoisting robot 6 to disengage the intelligent hoisting robot from the track devices 5 on the longitudinal route and connect to the track devices 5 on the lateral route, and the intelligent hoisting robot 6 performs hoisting and installation of the column and beam prefabricated components required for the plant on the track devices 5 and along the lateral route.

S5, at a turn of the lateral route, the driving end of the self-lifting device acts on the intelligent hoisting robot 6 to disengage the intelligent hoisting robot 6 from the track devices 5 on the lateral route, and after the track devices 5 are turned and mounted to the longitudinal route, the intelligent hoisting robot 6 is connected to the track device 5 on the longitudinal route, and the intelligent hoisting robot 6 performs hoisting and installation of the column and beam prefabricated components required for the plant on the track devices 5 and along the longitudinal route.

Figure 3:
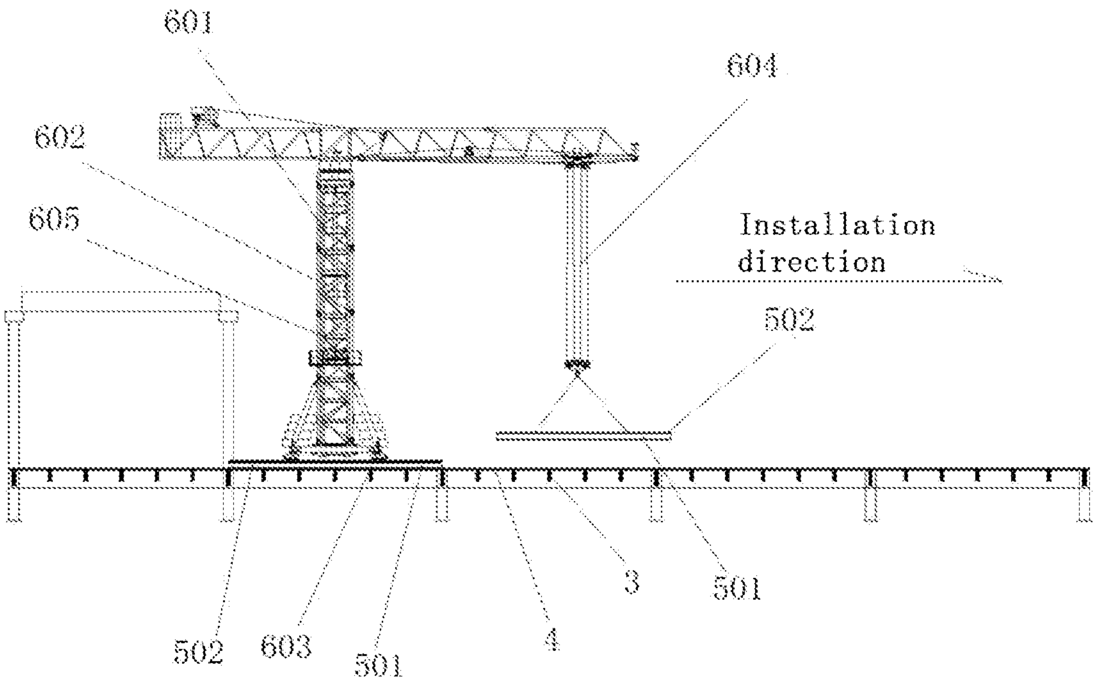
FIG. 3 is a schematic elevational diagram of the intelligent hoisting robot carrying out a hoisting installation of column and beam prefabricated components required for a plant along a longitudinal route according to the present disclosure.

Specifically, as shown in FIG. 3, in S3, S4 and S5, the specific steps of the intelligent hoisting robot 6 moving along the track devices 5 are as follows.

Figure 4:
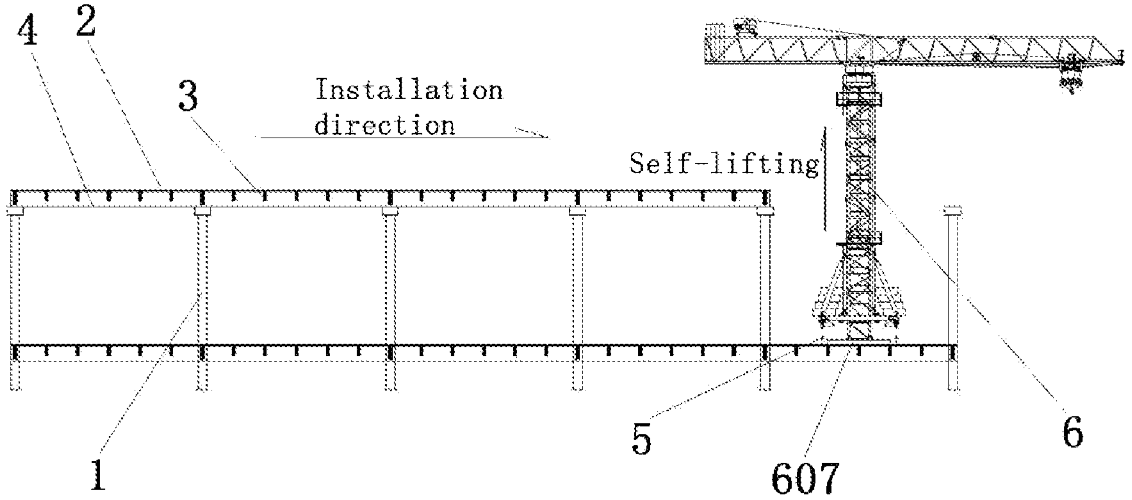
FIG. 4 is a schematic elevational diagram of the intelligent hoisting robot carrying out a hoisting installation of column and beam prefabricated components required for a plant along a lateral route according to the present disclosure.
Figure 5:
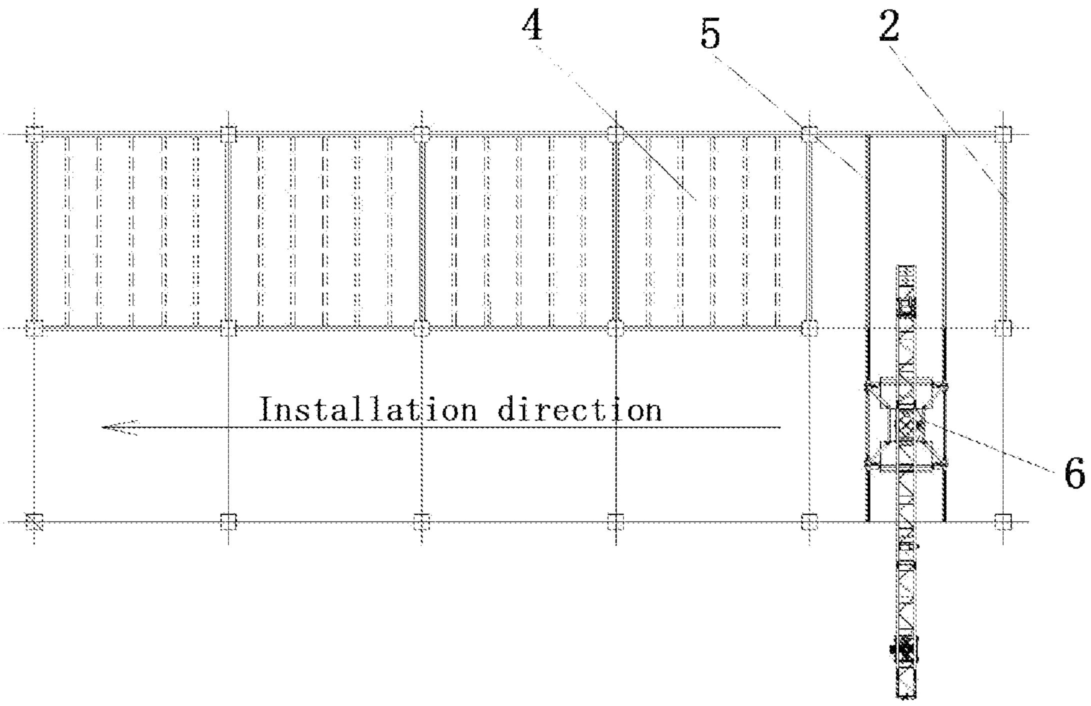
FIG. 5 is a schematic plan diagram of the intelligent hoisting robot carrying out the hoisting of column and beam prefabricated components required for a plant along a lateral route according to the present disclosure.

The track devices 5 are divided into the first set of track devices 5 and the second set of track devices 5. When the intelligent hoisting robot 6 moves to the second set of track devices and the column and beam prefabricated components within reach of intelligent hoisting robot at the first set of track devices 5 are installed, the intelligent hoisting robot 6 is utilized to remove and hoist the first set of track devices 5 and move to the second set of track devices for installation. Similarly, after the column and beam prefabricated components within reach of the intelligent hoisting robot at the second set of track devices 5 are installed, the intelligent hoisting robot 6 is utilized to remove and hoist the second set of track devices 5 and move to the second set of track devices 5 for installation. Repeat the foresaid steps until the intelligent robot 6 moves to the bay at the other end of the plant;

Specifically, as shown in FIGS. 4 and 5, in S4, S5, the specific steps for the turning of the intelligent hoisting robot 6 at the turn of the installation route are as follows.

A beam seat 607 is provided below the intelligent hoisting robot 6 as a support for the lifting, the beam seat 607 is provided on the floor plane. After the moving device 603 is raised to a certain height by the self-lifting device 605, the track devices 5 below the moving device 603 are disassembled and turned 90 degrees for installation. Then the moving direction of the moving device 603 of the intelligent robot is adjusted follow the installation direction of the track devices below the moving device 603, the moving device 603 is lowered back to the track devices 5 and moves thereon. When moving to another turn of the installation routes again, the intelligent robot performs the steps of lifting and lowering back again, and the moving direction of the moving device is adjusted to follow the installation direction of the track devices 5 below the moving device.

Specifically, in S3, S4 and S5, the hoisting of the column and beam prefabricated components includes the supporting column 1, the frame beam 2 and the secondary beam 3 required for installation, and then the conventional tower crane is arranged to alternately perform the hoisting and installation of the prefabricated composite floor 4 and wall panels, as well as the pouring of floor concrete. Furthermore, not to install the secondary beam 3 and the prefabricated composite floor 4 temporarily when the intelligent hoisting robot 6 moves to the last bay surrounded by the support column 1, thereby leaving a lifting passage for the intelligent hoisting robot 6 to be self-lifted.

In S6, after installation of the floor plane, lifting the intelligent hoisting robot 6 to the installed floor plane via the self-lifting device 605, and repeating the above-mentioned steps of S1 to S5 until the roof of the multi-story plant is installed, wherein the specific steps of the intelligent hoisting robot 6 being lifted to a top position of the installed floor plane via the self-lifting device 605 are as follows.

Figure 6:
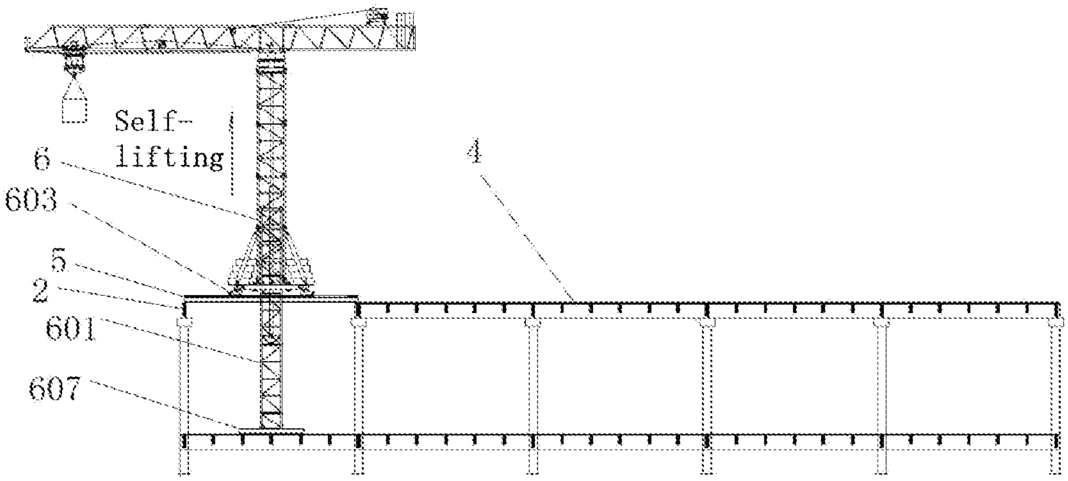
FIG. 6 is a schematic diagram of a process for the intelligent hoisting robot to be self-lifted to a next floor according to the present disclosure.
Figure 7:
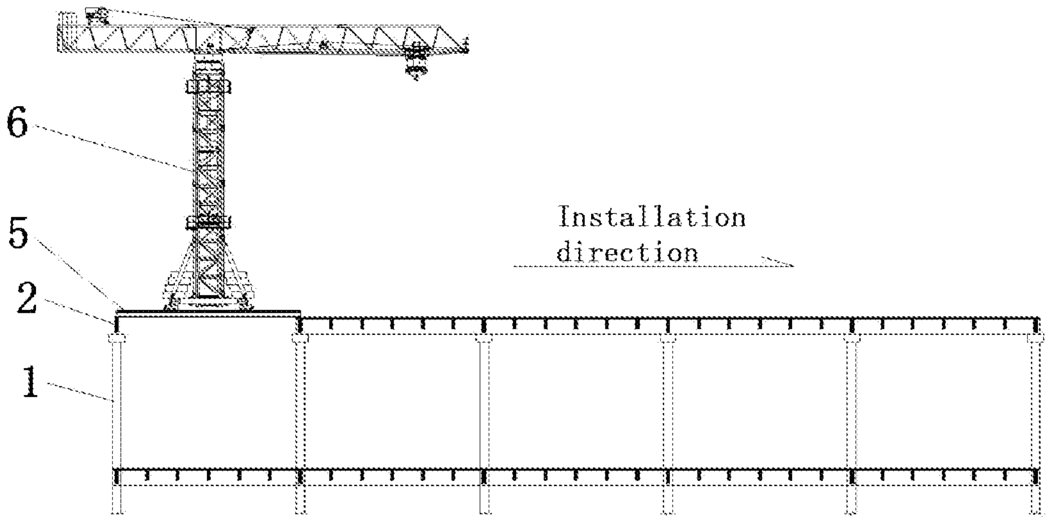
FIG. 7 is a schematic elevational diagram of a process for the intelligent hoisting robot performing self-lifting to a next floor according to the present disclosure.

As shown in FIGS. 6 and 7, employing the intelligent hoisting robot 6 to remove the prior set of the track devices 5, hoisting the prior set of the track devices to the vicinity of the predetermined installation position of a next floor without obstructing the passage for the intelligent hoisting robot 6 to be self-lifted.

A beam seat 607 is provided below the inner tower body 601 of the intelligent hoisting robot 6 as a support for self-lifting; and the self-lifting device 605 of the intelligent hoisting robot 6 is utilized to raise the moving device 603 to a appropriate position at the top elevation of the predetermined track devices 5. After the track devices 5 are raised to the vicinity of the predetermined position and mounted in place, the self-lifting device 605 is employed to perform the lowering of the intelligent hoisting robot 6 and the connection between the self-lifting device 605 and the track devices 5. Finally, the inner tower body 601 of the intelligent hoisting robot 6 is retracted, reset and fixed.

In S7, the intelligent hoisting robot 6 and the track devices 5 are removed via a conventional tower crane or an automobile crane, or via a mechanical equipment such as a gin pole.

The construction method for a fully prefabricated multi-story concrete plant provided by the present disclosure may achieve full coverage of a hoisting operation of the large beam and column prefabricated components of a floor by employing a single intelligent hoisting robot, an angle change of the track devices, an angle change of a moving device, and a self-lifting device. It is not necessary to arrange a transition track at the turn of the installation route, which saves space and installation cost, and overcomes the disadvantage of high cost caused by the traditional prefabricated construction mode of multi-story concrete plant, which needs to arrange a plurality of large hoisting equipment. It may achieve the mechanization and intelligence of the whole construction process of the fully prefabricated multi-story concrete plant, and break through the industrial dilemma that the traditional prefabricated construction mode is employed for the construction of the concrete plant in Industry's Going Upstairs, and the cast-in-place construction mode is still utilized for a large number of projects, thereby achieving the cost reduction and efficiency improvement. Not only will the present disclosure fill the gap in the international and Chinese key technologies of the whole process of industrialized construction of the concrete plant in Industry's Going Upstairs project, which leads and promotes the development of state's prefabricated buildings and intelligent construction, but it also have great significance for the advance of science and technology in state's construction industrialization.

In the description herein, it is appreciated that the terms "upper", "lower", "left", "right", etc. indicating orientation or positional relationship are merely utilized to facilitate the description and to simplify the operation, and do not indicate or imply that the device or element being referred to have a particular orientation, be constructed and operated in a particular orientation, and therefore not for purposes of any restrictions or limitations on the disclosure. Furthermore, the terms "first", "second", and the like are used merely to distinguish one from another in the description and are not intended to be limiting.

In the description, the terms "an embodiment", "an example", etc. means that a particular feature, structure, material, or characteristic described in connection with the embodiment or example is included in at least one embodiment or example of the disclosure. In the description, schematic expressions of the above terms do not necessarily refer to the same embodiment or example.

In addition, it should be understood that while the description has been described in terms of embodiments, not every embodiment includes a single technical solution, the description is described for clarity only, and that a person skilled in the art will take the description as a whole, and the solutions in various embodiments may be appropriately combined to form other embodiments as may be appreciated by a person skilled in the art.

The technical principles of the present disclosure have been described above in connection with specific embodiments. These descriptions are merely for purpose of illustrating the principles of the present disclosure and are not for purposes of any restrictions or limitations on the scope of the disclosure. Based on the explanations herein, a person skilled in the art would have been able to conceive other specific embodiments of the present disclosure without any inventive effort, which would all fall within the scope of the present disclosure.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'include', 'including', 'comprise' or 'comprising' do not exclude other steps or elements.

What is claimed is:

1. A construction method for a fully prefabricated multi-story concrete plant, comprising the following steps:

S1, arranging an installation route of a floor plane, wherein the installation route comprises a longitudinal route and a lateral route;

S2, laying track devices on the installation route, and installing hoisting robot on the track devices, wherein the hoisting robot comprises a self-lifting device, an inner tower body, an outer tower body, a moving device and a hoisting device, the outer tower body serves as a supporting structure during hoisting of the hoisting robot, the inner tower body serves as a guiding structure and a supporting structure during self-lifting of the hoisting robot, and the inner tower body cooperates with the outer tower body to constitute a self-lifting system of the hoisting robot, the self-lifting device provided between the inner tower body and the outer tower body comprises a jacking cylinder and a forced cross-beam, wherein the inner tower body is provided with a lower base, the outer tower body is provided with an upper base, the jacking cylinder is connected to the lower base via the forced cross-beam, and the jacking cylinder is connected to the upper base, the outer tower body is provided with a chassis, the moving device is provided on the chassis, the moving device includes an installation seat, a steering shaft, a motor, a connecting base, a moving wheel and a rail clamp, wherein the installation seat is connected to the chassis, both ends of the steering shaft are respectively rotatably connected to the installation seat and the connecting base; the motor, the moving wheel and the rail clamp are provided on the connecting base, and a driving end of the motor is employed for driving the moving wheel to rotate, and the hoisting device is connected to the outer tower body;

S3, performing hoisting and installation of column and beam prefabricated components required for the plant along the longitudinal route via the hoisting robot on the track devices;

S4, acting on the hoisting robot to disengage the hoisting robot from the track devices on the longitudinal route via a driving end of the self-lifting device at a turn of the installation route, and after the track devices are turned and mounted to the lateral route, the hoisting robot is connected to the track devices on the lateral route; and the hoisting robot on the track devices performs hoisting and installation of the column and beam prefabricated components required for the plant along the lateral route;

S5, acting on the hoisting robot to disengage the hoisting robot from the track devices on the lateral route via the driving end of the self-lifting device at a turn of the lateral route, and after the track devices are turned and mounted to the longitudinal route, the hoisting robot is connected to the track devices on the longitudinal route, and the hoisting robot on the track devices performs hoisting and installation of the column and beam prefabricated components required for the plant along the longitudinal route; and S6, lifting the hoisting robot to the floor plane installed via the self-lifting device after installation of the floor plane, and repeating the above-mentioned steps of S1 to S5 until a roof of the multi-story plant is installed.

2. The construction method of claim 1, wherein in S2, the track device comprises a movable steel beam, an embedded part and a track member, the movable steel beam is laid on the floor plane via the embedded part, and the track member is provided on an upper surface of the movable steel beam.

3. The construction method of claim 2, wherein at least two sets of track devices are provided, and each set of the track devices comprises two movable steel beams symmetrically arranged at both sides of the installation route.

4. The construction method of claim 1, wherein in S3, S4 and S5, the specific steps of the hoisting robot moving along the track devices are as follows: the track devices are divided into a first set of track devices and a second set of track devices, when the column and beam prefabricated components within reach of the hoisting robot at the first set of track devices are already installed, the hoisting robot moves to the second set of track devices, and the hoisting robot is utilized to remove and hoist the first set of track devices and move to the second set of track devices for installation along the installation route; similarly, after the column and beam prefabricated components within reach of the hoisting robot at the second set of track devices are installed, the hoisting robot is utilized to remove and hoist the second set of track devices and move to the first set of track devices for installation along the installation route, repeating the steps until the hoisting robot moves to a bay at one end of the plant.

5. The construction method of claim 1, wherein in S4 and S5, the specific steps for turning of the hoisting robot at the turn of the installation route are as follows:

a beam seat is provided below the hoisting robot as a support for the lifting, the beam seat is provided on the floor plane, after the moving device is raised to a certain height by the self-lifting device, the track devices below the moving device are disassembled and turned 90 degrees for installation, then a moving direction of the moving device of the hoisting robot is adjusted to follow an installation direction of the track devices below the moving device, the moving device is lowered back to the track devices and moves thereon, and when moving to another turn of the installation routes again, the hoisting robot performs the steps of lifting and lowering again, and the moving direction of the moving device is adjusted to follow the installation direction of the track devices below the moving device.

6. The construction method of claim 1, wherein in S3, S4 and S5, the hoisting of the column and beam prefabricated components includes installing a supporting column, a frame beam and a secondary beam, then a tower crane is arranged to alternately perform hoisting and installation of prefabricated composite floors and wall panels, and pouring of floor concrete; and not to install the secondary beam and the prefabricated composite floors temporarily when the hoisting robot moves to a last bay surrounded by the supporting columns, thereby leaving a lifting passage for the hoisting robot to be self-lifted.

7. The construction method of claim 6, wherein in S6, the specific steps of the hoisting robot being lifted to a next floor plane via the self-lifting device are as follows:

employing the hoisting robot to remove a prior set of the track devices, hoisting the prior set of the track devices to a vicinity of a predetermined installation position of a next floor without obstructing the lifting passage for the hoisting robot to be self-lifted; and a beam seat is provided below the inner tower body of the hoisting robot as a support for self-lifting, and the self-lifting device of the hoisting robot is utilized to raise the moving device to position above a predetermined installation position of the track devices, after the track devices are raised to the vicinity of the predetermined installation position and mounted in place, the self-lifting device is employed to perform the lowering of the hoisting robot and the connection between the self-lifting device and the track devices; and finally the inner tower body of the hoisting robot is retracted, reset and fixed.

8. The construction method of claim 6, wherein prior to step S1, arranging one or more tower cranes at a plane position of the plant structure for the transportation of the column and beam prefabricated components from the ground to each floor in a vertical direction, as well as the installation of the prefabricated composite floors and the wall panels, the tower cranes are arranged for minimizing the horizontal transportation amount from an unloading point of the column and beam prefabricated components to each installation position, and meeting requirements for hoisting the prefabricated composite floor and the wall panels;

alternatively, an automobile crane(s) or a crawler crane(s) is/are utilized to achieve transportation of the column and beam prefabricated components in the vertical direction, as well as the hoisting of the prefabricated composite floors and the wall panels in order to reduce cost.

9. The construction method of claim 1, further comprising S7: the hoisting robot and the track devices are removed via a tower crane or an automobile crane, or via a gin pole.

* * * * *